United States Patent [19]
Hassibi et al.

[11] Patent Number: 5,654,849
[45] Date of Patent: Aug. 5, 1997

[54] MOLDED SWING-TYPE ACTUATOR ASSEMBLY WITH PRESS-FIT PIVOT AND SPRING-LOADED GROUND CONDUCTOR ELEMENTS

[75] Inventors: Payman Hassibi; Mark A. Hathaway, both of San Jose, Calif.; Stephen A. Misuta, Singapore, Singapore; Scott E. Watson, San Jose, Calif.

[73] Assignee: Western Digital Corporation, Irvine, Calif.

[21] Appl. No.: 547,640

[22] Filed: Oct. 24, 1995

[51] Int. Cl.$^6$ ............................................. G11B 17/00
[52] U.S. Cl. ........................ 360/98.07; 360/97.01; 360/99.08
[58] Field of Search ........................ 360/106, 97.01, 360/98.08, 99.05, 99.12, 99.08, 98.07

[56] References Cited

U.S. PATENT DOCUMENTS

| | | | |
|---|---|---|---|
| 4,754,353 | 6/1988 | Levy | 360/106 |
| 5,122,703 | 6/1992 | Takahashi et al. | 310/36 |
| 5,148,071 | 9/1992 | Takahashi | 310/208 |
| 5,168,184 | 12/1992 | Umehara et al. | 310/13 |
| 5,168,185 | 12/1992 | Umehara et al. | 310/15 |
| 5,184,265 | 2/1993 | Foote et al. | 360/106 |
| 5,251,085 | 10/1993 | Morris et al. | 360/106 |
| 5,382,851 | 1/1995 | Loubier | 310/13 |

*Primary Examiner*—John H. Wolff
*Attorney, Agent, or Firm*—Leo J. Young, Esq.

[57] ABSTRACT

A disk drive comprises a pivot cartridge and a molded plastic actuator body. The cartridge includes a shaft and has an outer surface that is generally cylindrical and includes first and second ring-shaped portions and a necked-down portion separating the first and second ring-shaped portions. The body has a bore hole with an inner cylindrical surface that is deformable to expand from a first diameter to a second diameter. Each of the first and second ring-shaped portions has the second diameter and is disposed in an interference fit with the inner cylindrical surface.

4 Claims, 5 Drawing Sheets

MOLDED SWING-TYPE ACTUATOR ASSEMBLY WITH PRESS-FIT PIVOT AND SPRING-LOADED GROUND CONDUCTOR ELEMENTS

BACKGROUND OF THE INVENTION

1. Field of the Invention

This invention relates generally to a swing-type actuator for use in rotating disk data storage apparatus and particularly to a molded plastic actuator fabricated without fasteners.

2. Description of the Related Art

Magnetic disk data storage devices known in the art require a swing-type or rotation-type actuator to position the magnetic data sensing elements on the data recording tracks of a rotating magnetic disk. The magnetic data storage art is replete with swing-type actuators such as the actuator assembly 10 shown in FIG. 1. The overriding requirement known in the art is for mass-producible component constructions that are reliably high-performance. A typical actuator assembly known in the art, such as actuator assembly 10 in FIG. 1, includes an aluminum E-block 12 fabricated by machining an aluminum casting or extrusion. E-block 12 includes one or more actuator arms exemplified by actuator arm 14. A magnetic data head (not shown) is fixed to the end of each such actuator arm in a position exemplified by the position 16 on actuator arm 14. E-block 12 also includes a bore hole 18 disposed to receive a pivot assembly (not shown) for supporting the rotation of E-block 12 about a pivot axis 20. As E-block 12 rotates back and forth about pivot axis 20, each of the heads (not shown) at the actuator arm tips exemplified by arm tip 16 swings across the data recording tracks of a rotating magnetic disk (not shown) in the manner well-known in the art for such swing-type actuator assemblies.

An electrical coil 22 is attached to E-block 12 on the opposite side of axis 20 from head position 16. Coil 22 operates in cooperation with several fixed magnetic fields (not shown) and current-generating means (not shown) for forcing electrical current through coil 22 to generate a lateral force on actuator assembly 10, causing assembly 10 to rotate one way or the other about pivot axis 20 in response to the direction and magnitude of current flowing in coil 22, as is well-known in the art. A latch tang 24 may be fixed to coil 22 for interacting with a latch mechanism (not shown) for restraining actuator assembly 10 when the disk drive mechanism is inactivated. Latch tang 24, precision-wound coil 22 and E-block 12 are typically over-molded in plastic (not shown) to provide the necessary connecting structure. This construction is mass-producible and reliable but, because of the uniform metallic composition of E-block 12, actuator assembly 10 has an inherently high inertial resistance to the rotational motion required during head positioning. This high inertia reduces data access speed and may also reduce data transfer rates in some circumstances. Moreover, the machining process required to form E-block 12 is a relatively expensive manufacturing process. Reducing the mass of E-block 12 by substituting magnesium or some other lower-density metal may actually increase fabrication cost disproportionately to the improved rotational inertia because of additional fabrication steps. Also, a pivot assembly (not shown) must be somehow inserted and fixed to bore hole 18 with stability sufficient to minimize pivot-axis runout, which causes unpredictable tracking errors. Pivot bearing fastening methods known in the art include threaded fasteners, snap-rings and adhesives. Threaded fasteners and snap-rings are both relatively costly and time-consuming techniques and adhesives may introduce reliability and quality problems to the manufacturing process. A typical pivot mechanism known in the art (not shown) includes a ball-bearing mount coupled to rigid (metallic) bore hole 18 by means of snap-rings or threaded fasteners.

Practitioners in the art have proposed numerous incremental improvements to the actuator assembly design typified by actuator assembly 10 in FIG. 1. For instance, in U.S. Pat. No. 5,122,703, Fumihiko Takahashi et al. teach an improvement in joining coil 22 to E-block 12 that consists of fixing the two together by a hold member made of a thermal plastic resin having an elastic modulus greater than a specified value. In U.S. Pat. No. 5,148,071, Takahashi teaches the use of a nonconductive stiffening plate disposed over coil 22, with both coil and plate integrally molded (over-molded) to E-block 12. Both Takahashi inventions teach solutions to the coil-block joint flexure problem known to cause head tracking errors.

Similarly, in U.S. Pat. No. 5,168,184, Teruo Umehara et al. disclose a swing-actuator assembly that uses a plastic molded hold member no thicker than the coil element to connect coil and block, thereby reducing rotational inertia without losing the desired rigidity of the coil-block joint. In U.S. Pat. No. 5,168,185, Umehara et al. address the related problem of disk drive contamination caused by "flash formation" during encapsulation (over-molding) of the actuator arm assembly. Umehara et al. show how to use a diluted epoxy coating over the encapsulated swing-type actuator to prevent shedding of injection-mold plastic particles (flashes). Takahashi et al. and Umehara et al. consider only the coil-block joint rigidity issues relating to coil 22 and E-block 12 in FIG. 1.

In U.S. Pat. No. 5,382,851, Robert Loubier discloses a different swing-type actuator of the type exemplified by the actuator 26 in FIG. 2. Actuator 26 reduces rotational inertia by encapsulating a coil carrier 30 and individual metallic actuator arms exemplified by the actuator arm 28 into a central plastic body 32, thereby eliminating the heavy central body 34 (FIG. 1) of the E-block known in the art. Loubier's invention introduces several new disadvantages. The coil-block joint problem known in the art is exacerbated because most of the central portion 34 of the E-block is replaced with plastic, thereby perhaps introducing more flexibility in the alignment between coil carrier 22 and actuator arm plurality 36. Also, pivot-axis runout is increased because of increased flexibility at the inner surface of the bore hole 40. Loubier does not consider solutions to this problem beyond merely drilling into plastic pivot body 32 a bore hole 40 to accept an unspecified cartridge bearing assembly. Loubier considers no means for rigidly attaching his cartridge bearing assembly (not shown) to his molded plastic body 32.

The introduction into non-conductive plastic body 32 of individual conductive actuator arms exemplified by actuator arm 28 creates a static charge problem that is not known for monolithic metallic E-block actuator assemblies. Loubier resolves this problem by using a press-fit conductive pin 42 inserted through a series of precisely-aligned holes in the actuator arm plurality 36, as shown in FIG. 3. One end of conductive pin 42 is then coupled to a ground potential in some manner. The precise alignment of the actuator arm plurality 36 needed for insertion of grounding pin 42 requires jigging or drilling steps additional to those steps required for actuator fabrication using a monolithic aluminum block. He also suggests coupling arm plurality 36 through conductive pivot journal 38 at the edges exemplified by edge 44 (FIG. 3), or by means of a conductive plastic filler (not shown) contacting actuator arm plurality 36 in body 32. Although each of these techniques resolves the static charge accumulation problem, all introduce some particular new fabrication steps, thereby increasing manufacturing cost.

Without solutions for these and other disadvantages of the molded plastic actuator assembly known in the art, practitioners are obliged to accept unwanted new fabrication costs to obtain a desired reduction in rotational inertia. Certain of these unresolved problems and deficiencies are clearly felt in the art and are solved by this invention in the manner described below.

SUMMARY OF THE INVENTION

Embodiments of this invention solves two of the above problems. The static accumulation problem is resolved by adding a spring-loaded grounding element that eliminates all fabrication steps associated with a conductive filler, a molded metallic journal or a carefully-aligned press-fit conductive element. Even so, this invention ensures rigid coupling of the plastic actuator body to a pivot axis without fasteners or metallic journals molded into the plastic body. Both the spring-loaded ground conductor element and the press-fit pivot element of this invention improve actuator tracking performance and reliability while reducing plastic actuator manufacturing cost.

This invention can be regarded as a disk drive comprising a pivot cartridge and a molded plastic actuator body. Certain features of the cartridge and the body provide advantages including advantages as to low cost and easy assembly. The drive further includes a base; a disk having a recording surface; a head; and an actuator arm projecting from the body for supporting the head adjacent the recording surface. The drive further includes permanent magnet means for providing a magnetic field and coil means supported by the actuator body in the magnetic field. Significantly, the molded plastic actuator body has a bore hole with an inner cylindrical surface that is deformable to expand from a first diameter to a second diameter. The pivot cartridge comprises a shaft fixed to the base and has an outer surface that is generally cylindrical. Significantly, the outer surface includes first and second ring-shaped portions and a necked-down portion, the first and second ring-shaped portions being spaced apart by the necked-down portion. Each of the first and second ring-shaped portions has the second diameter and is disposed in an interference fit with the inner cylindrical surface.

It is an object of this invention to improve disk actuator performance without increasing disk actuator inertia. It is an advantage of this invention that it provides a disk drive actuator assembly that is capable of more precise head-positioning control than the low-inertia molded plastic actuator known in the art.

It is another object of this invention to reduce fabrication complexity and cost. It is another advantage of this invention that it provides a disk drive actuator assembly that is less expensive to fabricate than the low-inertia molded plastic actuator known in the art.

The foregoing, together with other objects features and advantages of this invention, can be better appreciated with reference to the following specification, claims, and the accompanying drawing.

BRIEF DESCRIPTION OF THE DRAWING

For a more complete understanding of this invention, reference is now made to the following detailed description of the embodiments as illustrated in the accompanying drawing, in which like reference designations represent like features and wherein.

DETAILED DESCRIPTION OF THE PREFERRED EMBODIMENTS

Figure 1:
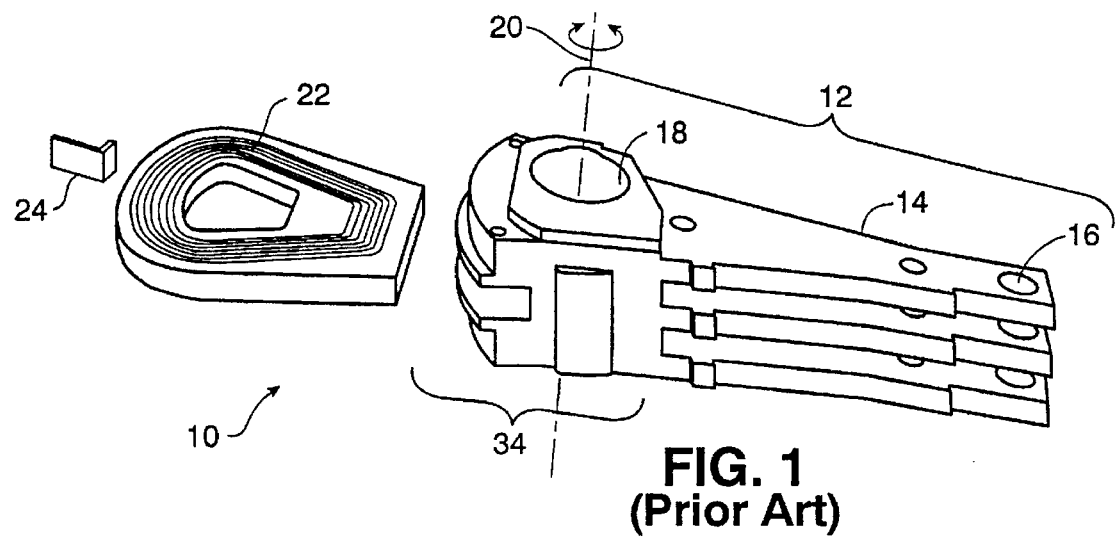
FIG. 1 shows a perspective view depicting a common disk drive actuator from the prior art.
Figure 2:
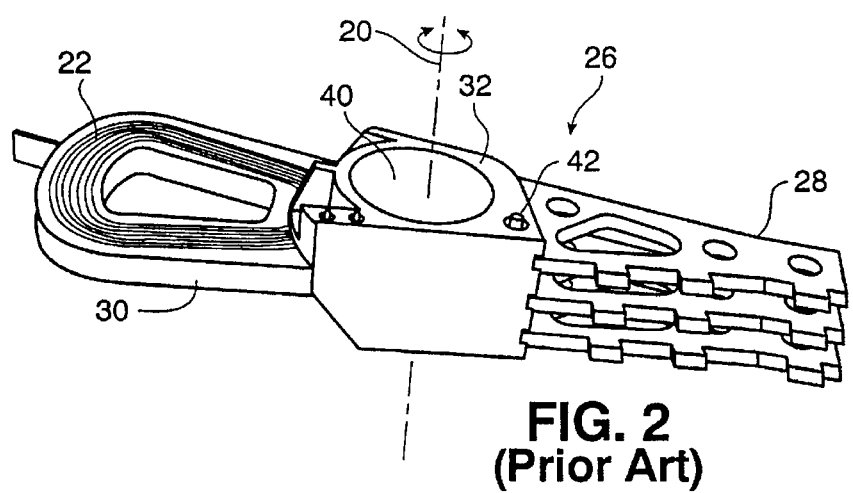
FIG. 2 shows a perspective view of a low inertia disk actuator from the prior art.
Figure 3:
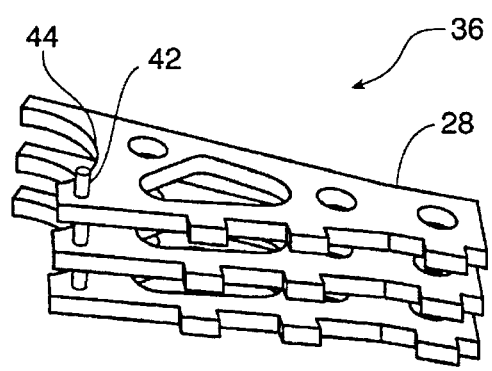
FIG. 3 shows a perspective view of the actuator arm plurality from FIG. 2 coupled by a press-fit grounding pin from the prior art.

The molded actuator assembly of this invention provides improved tracking speed through reduced inertia and reduced fabrication cost without reducing tracking accuracy. A plastic over-molding provides the connecting structure between a plurality of actuator arms and a motor coil, as discussed above in connection with FIGS. 2–3. Lower inertia is achieved by minimizing the necessary metallic content of the actuator assembly. All extraneous structural metal is eliminated from the assembly of this invention so that a lower-density plastic structure can reduce assembly inertia. The several individual actuator arms may be stamped from sheet-metal stock in a single operation before molding into the assembly and the must be conductively coupled to ground potential to prevent accumulation of static charges during operation. Pivot axis stability must also be maintained in the softer material.

Figure 4:
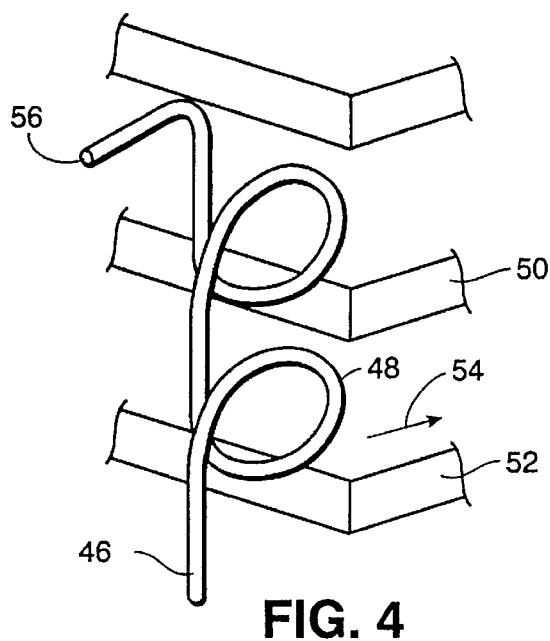
FIG. 4 shows a perspective view of a first embodiment of the spring-loaded ground conductor element of this invention.

FIG. 4 shows the first of several embodiments of the spring-loaded ground conducting element of this invention, each of which provides the necessary static-charge grounding for every conductive actuator arm without additional machining or precision alignment fabrication steps. FIG. 4 shows a metal insert 46 with two loops exemplified by loop 48 each adapted to be press-fit between a corresponding actuator arm pair exemplified by actuator arms 50 and 52 in the direction shown by the arrow 54. Spring insert 46 and portions of the actuator arm pairs exemplified by arms 50 and 52 may be encapsulated in the molded actuator body (body 32 in FIG. 2). A solderable pin 56 is formed in spring insert 46 and disposed to protrude for electrical connection following plastic encapsulation of the assembly.

Figure 5:
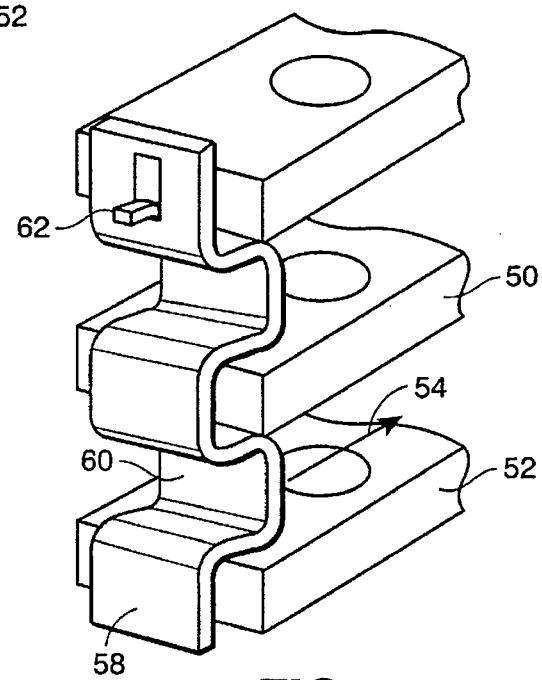
FIG. 5 shows a perspective view of a second embodiment of the spring-loaded ground conductor element of this invention.

FIG. 5 shows an alternative embodiment of the spring-loaded ground conductor element of this invention for grounding the actuator arm pairs exemplified by arms 50 and 52. A stamped spring insert 58 is formed of a thin sheet metal or metallic foil with several crimped extensions exemplified by crimped extension 60, each adapted to be press-fit between a corresponding actuator arm pair by pressing insert 58 in the direction shown by arrow 54. Because of its shape, insert 58 provides substantially more conductive contact area with support arms 50 and 52 than does insert 46 (FIG. 4). As discussed above in connection with FIG. 4, insert 58 and the contacting portion of the actuator arms exemplified by arms 50 and 52 may be over-molded when forming the molded actuator body (body 32 and FIG. 2). A solderable pin 62 is also provided at one extremity of insert 58 for connecting insert 58 to a ground potential after completion of the plastic body molding step.

Figure 6A:
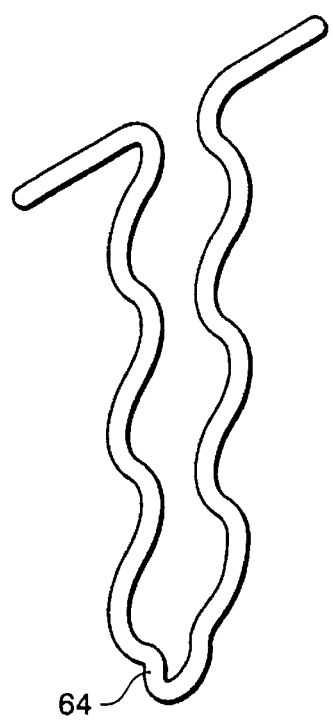
FIGS. 6A and 6B show perspective views of a third embodiment of the spring-loaded ground conductor element of this invention.
Figure 6B:
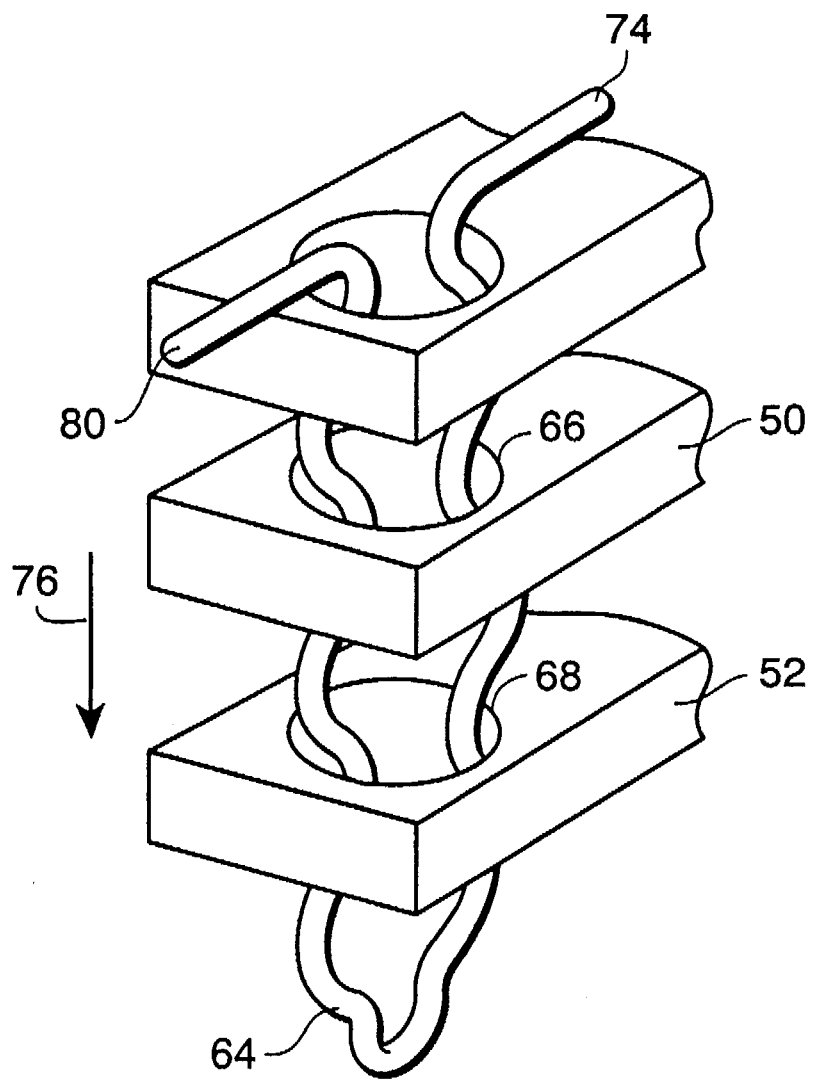

FIGS. 6A–6B show another alternative embodiment of the spring-loaded ground conductor element of this invention. A sinuous U-pin 64 (FIG. 6A) is adapted for insertion through a series of approximately-aligned holes exemplified by holes 66 and 68 in actuator arms 50 and 52 in FIG. 6B, wherein it is retained by spring-tension against the sides thereof. FIG. 6B shows that U-pin 64 is adapted to contact the actuator arms at the inner surfaces of the holes exemplified by holes 66 and 68. U-pin 64 is inserted through these holes in the direction shown by the arrow 76, which may be redirected somewhat to accommodate minor hole misalignment. After insertion, ends 74 and 80 operate to retain U-pin 64 in the position shown in FIG. 6B. The rippled geometry of U-pin 64 ensures a more reliable contact to all surfaces without requiring the press-fit insertion steps for conductor 42 (FIG. 3) known in the prior-art. In accordance with this invention, assembly of either insert 46 (FIG. 4), insert 58 (FIG. 5), or U-pin 64 (FIGS. 6A–6B) may be accomplished without precision alignment or drilling steps.

The spring-loaded ground conductor element of this invention discussed above in connection with FIGS. 4–6 eliminates the precision alignment and or drilling steps required in the prior art to assemble the interference-fit ground conductor elements such as the through-pin 42 discussed above in connection with FIG. 3. Other similar embodiments, such as a metallic coil spring or the like (not shown) adapted for misaligned insertion and retention by spring-force between corresponding pairs of conductive actuator arms may also be used equivalently to accomplish the grounding function of this invention. Similarly, a conductive epoxy, such as the commercially available BOND-LINE™ 2121 by Bondline Technology Company of San Jose, Calif., may be used to used with any of the spring-loaded ground conductor embodiments discussed above to improve the conductive contact between actuator arms and ground conductive insert.

Figure 7A:
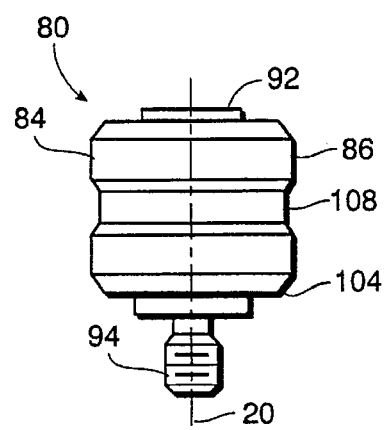
FIG. 7A shows a side view of a preferred embodiment of the press-fit pivot assembly of this invention.
Figure 7B:
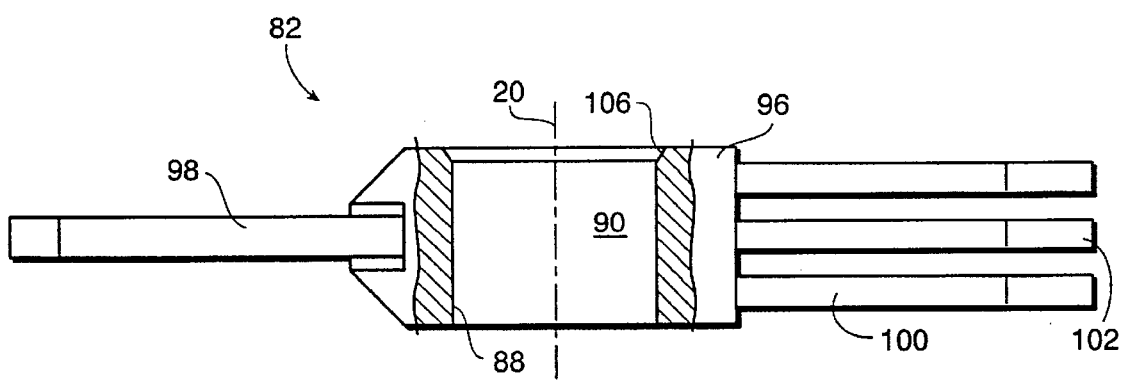
FIG. 7B shows a schematic cross-sectional view of the actuator assembly of this invention before insertion of the pivot assembly from FIG. 7A.
Figure 7C:
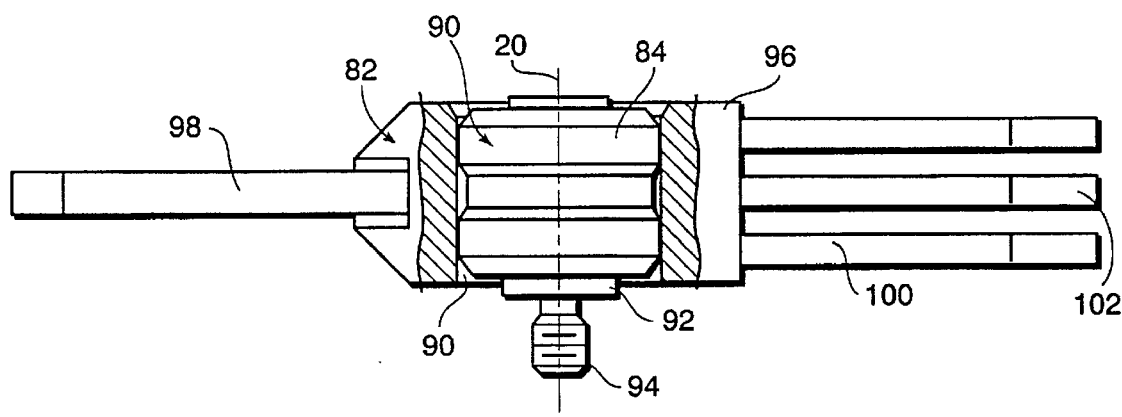
FIG. 7C shows a schematic cross-sectional view of the actuator assembly from FIG. 7B after insertion of the pivot assembly from FIG. 7A in accordance with the process of this invention.

The actuator assembly of this invention is disposed to swing about pivot axis 20 (FIG. 2), which is established by a pivot assembly cartridge of this invention. FIG. 7A shows a preferred embodiment of the pivot cartridge 80 of this invention. FIG. 7C shows that pivot cartridge 80 may be attached to the actuator assembly 82 of this invention (FIG. 7B–7C) by an interference fit without additional fasteners or processing steps. To accomplish this, pivot cartridge 80 includes a pivot sleeve 84 having an outer surface 86 that is slightly larger than the inner surface 88 of the bore hole 90 shown in FIG. 7B. Pivot sleeve 84 is formed of a material having a relatively high elastic modulus, such as steel. A shaft 92 is disposed within pivot sleeve 84 to act as a fixed support about which pivot sleeve 84 rotates during operation. Generally, shaft 92 is coupled to pivot sleeve 84 by means of some bearing, which may be a ball-type bearing or a sealed journal bearing or the like as known in the art. Shaft 92 has a threaded extension 94 for mating into a threaded hole in the base of a disk drive assembly as described below in connection with FIG. 8.

Actuator body 96 is molded from a plastic resin such as polyphenylene sulfide (PPS), polyphthalamide, or a liquid crystal polymer into a unitary piece, which includes encapsulation of coil carrier 98 on one side and a plurality of conductive actuator arms exemplified by arms 100 and 102 on the other side. All necessary electrical interconnection pins or terminals (not shown) are similarly encapsulated so that each extends slightly from actuator body 96 for making the necessary electrical connections thereto (not shown). Because body 96 consists substantially of a thermoplastic material with a relatively low elastic modulus, inner surface 88 of bore hole 90 deforms to accommodate most of the interference between inner surface 88 and outer surface 86 upon insertion of pivot cartridge 80 into bore hole 90. Since inner surface 88 accommodates most of the necessary deformation, outer surface 86 need not deform substantially, thereby ensuring proper operation of the bearing means between pivot sleeve 84 and shaft 92.

A chamfer 104 is provided on the leading corner edge of pivot sleeve 84 and a similar chamfer 106 is provided on the interior lip of bore hole 90 to guide insertion of pivot cartridge 80 into bore hole 90. For ease of manufacture, both edges of pivot sleeve 84 are chamfered, thereby eliminating the need for special positioning during assembly of pivot cartridge 80. Only chamfer 106 is provided in plastic body 96 because pivot cartridge 80 must be oriented for insertion to position threaded extension 94 downward, substantially as shown in FIG. 7C, which shows the actuator assembly 82 after insertion of pivot cartridge 80 into bore hole 90. Of course, a rounded edge (not shown) would operate as well wherever a chamfered edge shown.

Outer surface 86 is necked-down at middle position 108 (FIG. 7A) between first and second ring-shaped portions to improve the stability of pivot axis 20 by ensuring that outer surface 84 is in contact with inner surface 88 at two separated locations along pivot axis 20. That is, each of the ring-shaped portions, as shown in FIG. 7C, is disposed in an interference fit with inner surface 88. Without the necked-down region at position 108, much of the interference contact between pivot cartridge 80 and bore hole 90 might occur only at one position midway along axis 20. If this happens, pivot cartridge 80 could have enough space near the ends to rock back and forth with respect to plastic body 96 thereby causing pivot axis 20 to wobble during operation. Any wobbling of pivot axis 20 introduces tracking errors during positioning of read/write heads (not shown) at the ends of actuator arms exemplified by arms 100 and 102. Accordingly, it is an important advantage of this invention that the necked-down profile of outer surface 86 ensures a "two-point" interference-fit between pivot sleeve 84 and plastic body 96, thereby avoiding pivot-axis runout that causes non-repetitive head tracking errors. The uniform radial loading between pivot cartridge 80 and inner surface 88 of bore hole 90 also provides the rigid attachment required to minimize actuator positioning errors. This same uniform radial loading further creates a static frictional force that retains pivot cartridge 80 within bore hole 90, resisting external shock and vibration forces, without additional fasteners or processing steps.

The actuator assembly shown in FIG. 7C can be simply disassembled by pressing pivot sleeve 84 out of bore hole 90 because the elastic nature of the thermoplastic material in plastic body 96 permits it to return to its original dimensions so that it may be reassembled without losing the advantageous features of this invention. Moreover, while shown in FIG. 7C for a single actuator assembly 82, the pivot cartridge of this invention is readily adapted to embodiments having multiple actuator assemblies stacked one upon the other. Thus, actuator assembly 82 of this invention has the principle advantages of a simpler manufacturing process and improved performance and reliability and is suitable for use in a data storage apparatus such as the exemplary data storage apparatus 110 shown in FIG. 8.

Figure 8:
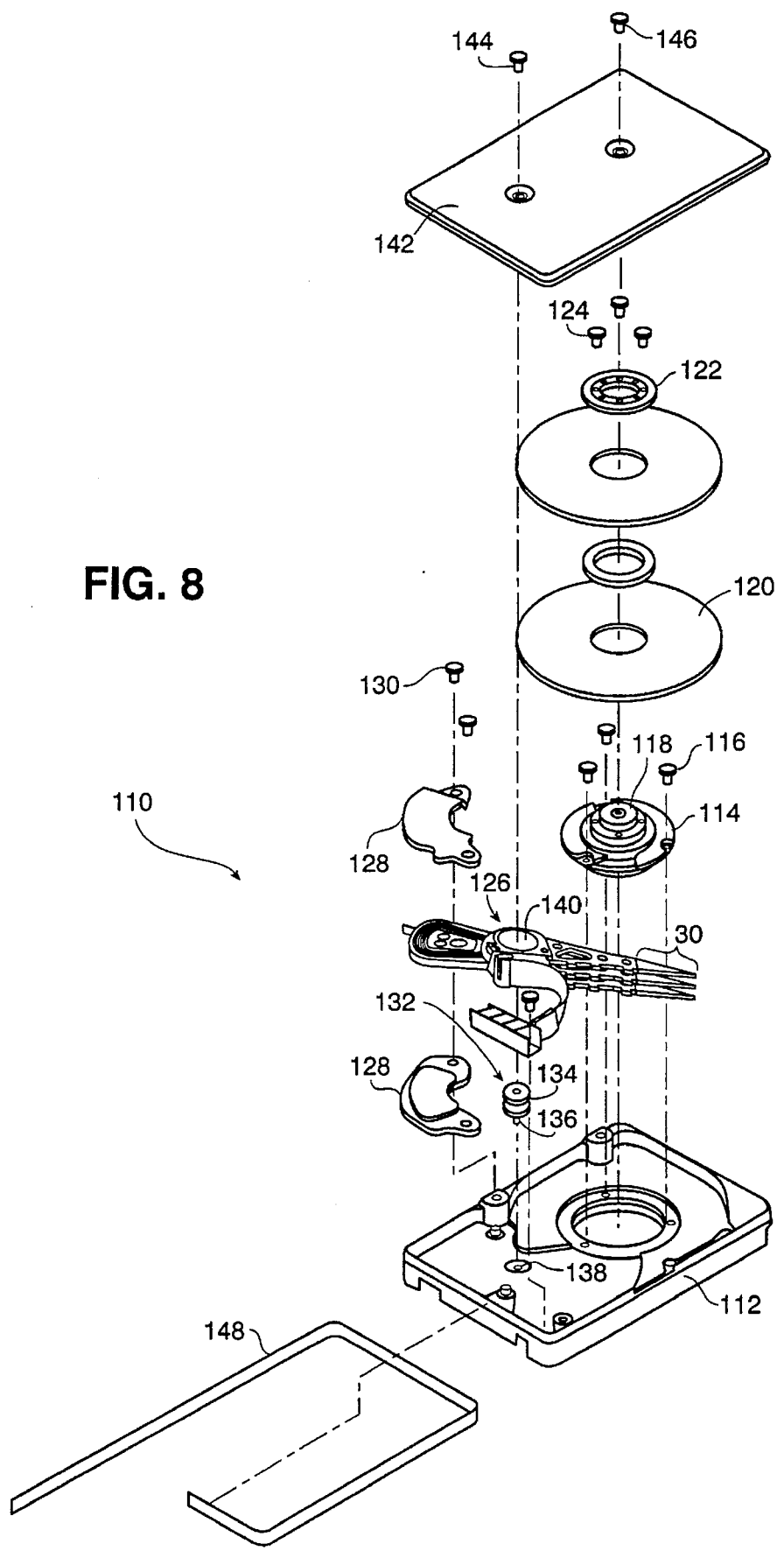
FIG. 8 shows an exploded perspective view of a rotating disk data storage device incorporating the actuator assembly of this invention.

FIG. 8 shows the basic construction of a data storage apparatus employing the actuator assembly of this invention. A base 112 provides a shelf for holding the operational components therein. A spindle motor 114 is fixed to base 112 by appropriate fasteners, exemplified by fastener 116. Spindle motor 114 has an extended spindle motor hub 118 to which is fastened at least one recording disk exemplified by disk 120 by means of a disk clamp 122 using appropriate fasteners exemplified by fastener 124.

While disk 120 is rotating at high speed, data is accessed thereon by means of the actuator assembly 126 of this invention in cooperation with the actuator motor 128, which is fixed to base 112 by appropriate fasteners exemplified by fastener 130. In accordance with this invention, actuator assembly 126 is mounted for rotary motion with respect to base 112 on a base-mounted pivot cartridge 132 of this invention. Cartridge 132 includes the pivot sleeve 134 and the pivot shaft 136, which is fixed to base 112 by threading into a complimentary receptacle 138. Pivot cartridge 132 is attached to actuator 126 by means of an interference-fit with a bore hole 140 substantially as described above in connection with FIGS. 7A–C. An enclosing cover 142 is fixed in place by means of a fastener 144 threaded into the top of pivot shaft 136 and a fastener 146 threaded into the top of spindle motor extension 118, thereby providing additional stabilization for both of these axes of rotation. Following assembly of cover 142, the mating joint is further sealed by means of a sealing tape 148 placed around the periphery of cover 142 where it mates with base 112.

Clearly, other embodiments and modifications of this invention may occur readily to those of ordinary skill in the art in view of these teachings. Therefore, this invention is to be limited only by the following claims, which include all such embodiments and modifications when viewed in conjunction with the above specification and accompanying drawing.

We claim:

1. A disk drive comprising:

a base;

a disk having a recording surface;

a head;

a molded plastic actuator body having a bore hole with an inner cylindrical surface that is deformable to expand from a first diameter to a second diameter;

an actuator arm projecting from the body for supporting the head adjacent the recording surface;

permanent magnet means for providing a magnetic field;

coil means supported by the actuator body in the magnetic field;

a pivot cartridge comprising a shaft and having an outer surface;

the outer surface being generally cylindrical and including first and second ring-shaped portions and a necked-down portion, the first and second ring-shaped portions being spaced apart by the necked-down portion;

the shaft being fixed to the base; and the first and second ring-shaped portions each having the second diameter and being disposed in an interference fit with the inner cylindrical surface.

2. The disk drive of claim 1, wherein the bore hole has a chamfered edge to guide insertion of the pivot cartridge into the bore hole.

3. The disk drive of claim 1, wherein the outer surface has a chamfered edge to guide insertion of the pivot cartridge into the bore hole.

4. The disk drive of claim 1, wherein the actuator arm is a metal stamping and the body includes an overmolded portion securing the actuator arm to the body.

* * * * *